(12) United States Patent
Guen

(10) Patent No.: US 10,938,016 B2
(45) Date of Patent: Mar. 2, 2021

(54) RECHARGEABLE BATTERY

(71) Applicant: Samsung SDI Co., Ltd., Yongin-si (KR)

(72) Inventor: Minhyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 157 days.

(21) Appl. No.: 16/301,927

(22) PCT Filed: May 25, 2017

(86) PCT No.: PCT/KR2017/005449
§ 371 (c)(1),
(2) Date: Nov. 15, 2018

(87) PCT Pub. No.: WO2017/222199
PCT Pub. Date: Dec. 28, 2017

(65) Prior Publication Data
US 2019/0312252 A1    Oct. 10, 2019

(30) Foreign Application Priority Data
Jun. 24, 2016 (KR) .................. 10-2016-0079649

(51) Int. Cl.
*H01M 2/26* (2006.01)
*H01M 2/02* (2006.01)
(Continued)

(52) U.S. Cl.
CPC .......... *H01M 2/26* (2013.01); *H01M 2/0207* (2013.01); *H01M 2/0237* (2013.01); *H01M 2/04* (2013.01);
(Continued)

(58) Field of Classification Search
CPC combination set(s) only.
See application file for complete search history.

(56) References Cited

U.S. PATENT DOCUMENTS 6,228,523 B1 *   5/2001   Azema .............. H01M 2/34
                                                 429/57
2012/0058389 A1 * 3/2012  Guen .............. H01M 10/052
                                                 429/179
(Continued)

FOREIGN PATENT DOCUMENTS

CN      104183814 A    12/2014
CN      104511017 A     4/2015
(Continued)

OTHER PUBLICATIONS

EPO Extended Search Report dated Nov. 5, 2019, for corresponding European Patent Application No. 17815612.1 (7 pages).
(Continued)

*Primary Examiner* — Michael L Dignan
(74) *Attorney, Agent, or Firm* — Lewis Roca Rothgerber Christie LLP (57) ABSTRACT

A rechargeable battery according to an exemplary embodiment of the present invention includes: an electrode assembly that includes a first electrode, a second electrode, and a separator that is disposed between the first electrode and the second electrode; a case that receives the electrode assembly and includes an opening; a cap plate that is coupled to the opening and includes a cutout; and a first current collecting member that is integrally formed with the cap plate and thus is bent toward the inside of the case from the cap plate, and is electrically connected with the first electrode.

9 Claims, 5 Drawing Sheets

(51) Int. Cl.
*H01M 2/04* (2006.01)
*H01M 2/30* (2006.01)
*H01M 2/36* (2006.01)
*H01M 2/34* (2006.01)
*H01M 10/0525* (2010.01)

(52) U.S. Cl.
CPC ............... *H01M 2/30* (2013.01); *H01M 2/34* (2013.01); *H01M 2/36* (2013.01); *H01M 10/0525* (2013.01); *Y02E 60/10* (2013.01); *Y02T 10/70* (2013.01)

(56) References Cited

U.S. PATENT DOCUMENTS

| | | |
|---|---|---|
| 2012/0258355 A1 | 10/2012 | Guen |
| 2014/0308575 A1 | 10/2014 | Kim et al. |
| 2014/0356700 A1 | 12/2014 | Song et al. |
| 2015/0044526 A1* | 2/2015 | Guen ............. H01M 2/348 429/61 |
| 2015/0111091 A1 | 4/2015 | Lee et al. |
| 2015/0118528 A1 | 4/2015 | Byun et al. |
| 2015/0255762 A1 | 9/2015 | Feigl |
| 2016/0099457 A1 | 4/2016 | Park et al. |

FOREIGN PATENT DOCUMENTS

| | | |
|---|---|---|
| CN | 104577177 A | 4/2015 |
| EP | 2284932 A1 | 2/2011 |
| EP | 2429011 A1 | 3/2012 |
| EP | 2 835 847 A1 | 2/2015 |
| EP | 3511998 A1 | 7/2019 |
| JP | 2014-75355 A | 4/2014 |
| JP | 2015-130248 A | 7/2015 |
| KR | 10-2012-0025854 A | 3/2012 |
| KR | 10-1244735 B1 | 3/2013 |
| KR | 10-2014-0124247 A | 10/2014 |
| KR | 10-2016-0042243 A | 4/2016 |

OTHER PUBLICATIONS

China Office Action in corresponding China Application No. 201780035958.6, China Office action dated Dec. 22, 2020 (14 pgs.).

* cited by examiner

RECHARGEABLE BATTERY

CROSS-REFERENCE TO RELATED APPLICATION(S)

This application is a National Phase Patent Application of International Patent Application Number PCT/KR2017/005449, filed on May 25, 2017, which claims priority of Korean Patent Application No. 10-2016-0079649, filed Jun. 24, 2016. The entire contents of both of which are incorporated herein by reference.

TECHNICAL FIELD

The present invention relates to a rechargeable battery.

BACKGROUND ART

A rechargeable battery is a battery that repeatedly performs charging and discharging, different from a primary battery. A rechargeable battery with small capacity is used in a portable small electronic device, such as a mobile phone, a notebook computer, and a camcorder, and a rechargeable battery with large capacity may be used as a motor driving power source for a hybrid vehicle and an electric vehicle.

A high output rechargeable battery using a non-aqueous electrolyte with high energy density has been recently developed, and the above-mentioned high output rechargeable battery is configured as a large capacity rechargeable battery by connecting a plurality of rechargeable batteries in series so as to be used for driving a motor of an apparatus requiring large power, for example, an electric car or the like.

Therefore, it is necessary to increase portability and capacity thereof. However, in order to increase portability, the capacity is reduced because it is reduced in size, and when the size is increased in order to increase the capacity, portability is deteriorated.

DISCLOSURE

Technical Problem

One aspect of the present invention is to provide a rechargeable battery that can have improved portability without reducing capacity.

Technical Solution

A rechargeable battery according to an exemplary embodiment of the present invention includes: an electrode assembly that includes a first electrode, a second electrode, and a separator that is disposed between the first electrode and the second electrode; a case that receives the electrode assembly and includes an opening; a cap plate that is coupled to the opening and includes a cutout; and a first current collecting member that is integrally formed with the cap plate and thus is bent toward the inside of the case from the cap plate, and is electrically connected with the first electrode.

The first current collecting member may include a fixed end that is adjacent to the cutout and a free end that is disposed inside the case, and the first electrode may be connected with the free end.

The first terminal may be coupled to the cutout to seal the case.

The first terminal may protrude in a direction along which a plate-shape member is away from the first current collecting member.

An outer edge of the first current collecting member may match an inner edge of the cutout.

The first current collecting member may be formed by cutting a part of the cap plate and bending the cut part of the plate.

The rechargeable battery may further include the case a first insulation member that is disposed on the cap plate outside of the case, wherein the second terminal may be disposed on the insulation member.

The rechargeable battery may further include a connection terminal that electrically connects the second current collecting member and the second terminal, wherein the connection terminal in a shape of a column may be connected with the second current collecting member through one end thereof, and is provided while penetrating the cap plate, the first insulation member, and the second terminal.

The rechargeable battery may further include a second insulation member that is disposed between the second current collecting member and the cap plate.

The rechargeable battery may further include a fuse formed in the first current collecting member.

Advantageous Effects

According to an exemplary embodiment of the present invention, a current collecting member can be formed by cutting a portion of the cap plate to simplify the configuration for connecting between the electrode terminal and the current collecting member. In addition, since the connection between the electrode terminal and the current collecting member is simplified, an internal structure of the case is simplified, and the height of the jelly roll is increased by the increased space, thereby realizing a high-capacity battery. In addition, the connection between the current collecting member and the electrode terminal is simplified, minimizing the current loss due to the resistance.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the scope of the present invention.

The drawings and description are to be regarded as illustrative in nature and not restrictive. Like reference numerals designate like elements throughout the specification.

Further, in the drawings, the size and thickness of each element are arbitrarily represented for better understanding and ease of description, but the present invention is not limited thereto.

In the drawings, the thickness of layers, films, panels, regions, etc., are exaggerated for clarity. In the drawings, for convenience of explanation, the thicknesses of some layers and regions are exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements, but not the exclusion of any other elements. Further, throughout the specification, the word "on" or "above" means positioned on or below the object portion, and does not necessarily mean positioned on the upper side of the object portion based on a gravitational direction.

Hereinafter, a rechargeable battery according to an exemplary embodiment will be described in detail with reference to the accompanying drawings.

Figure 1:
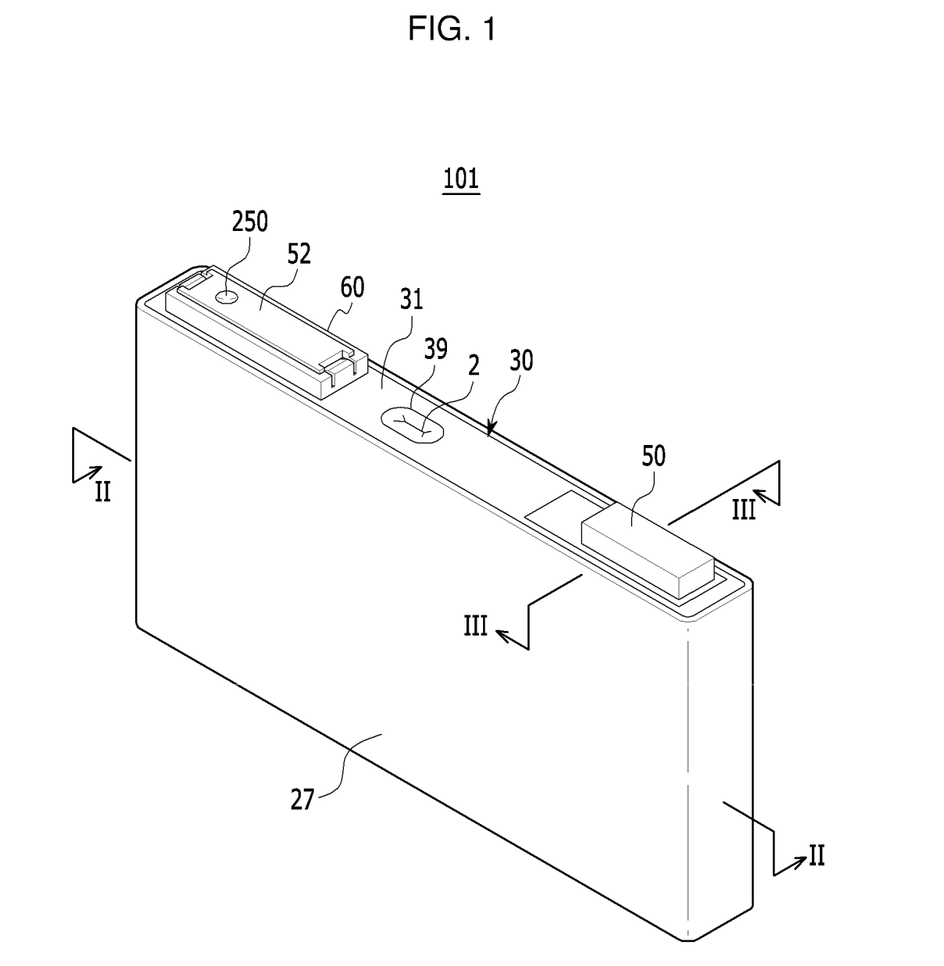
FIG. 1 is a perspective view of a rechargeable battery according to an exemplary embodiment of the present invention.
Figure 2:
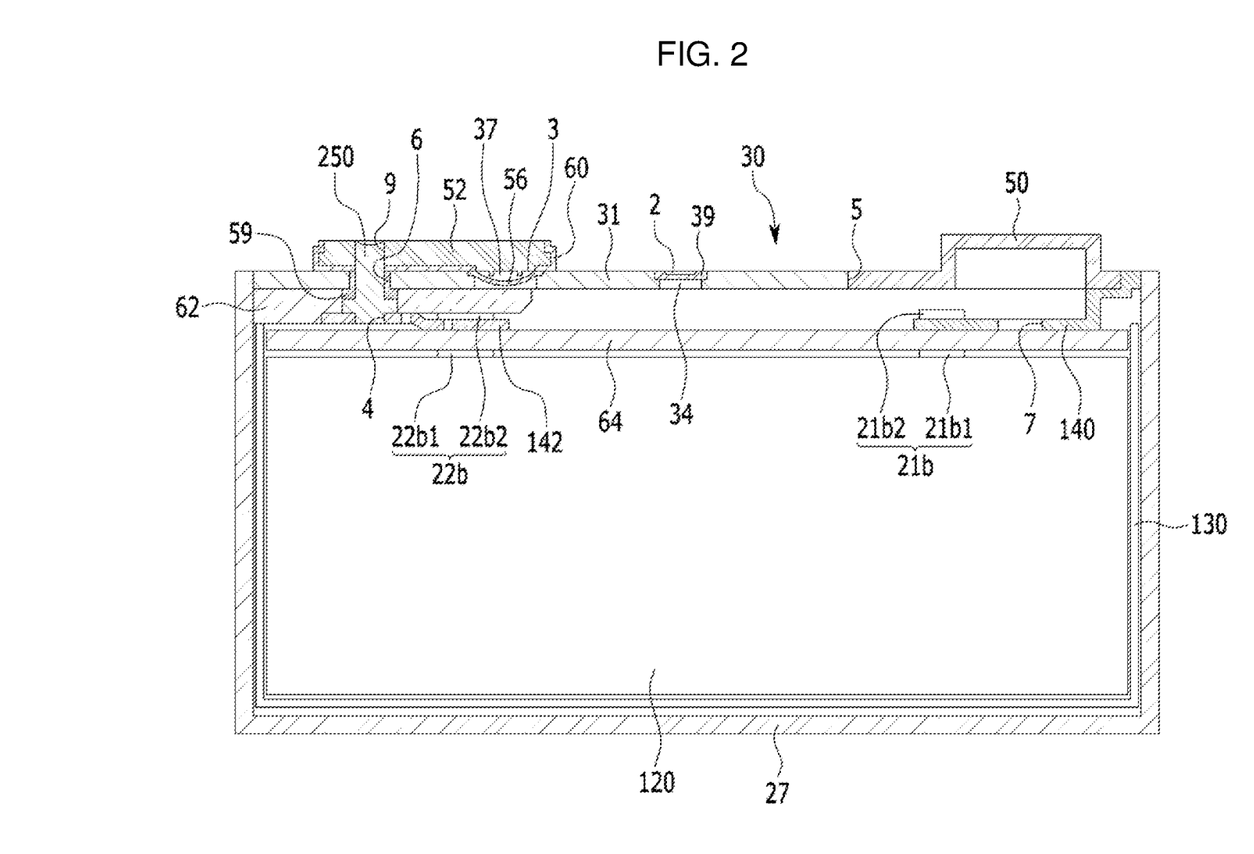
FIG. 2 is a cross-sectional view of FIG. 1, taken along the line II-II.
Figure 3:
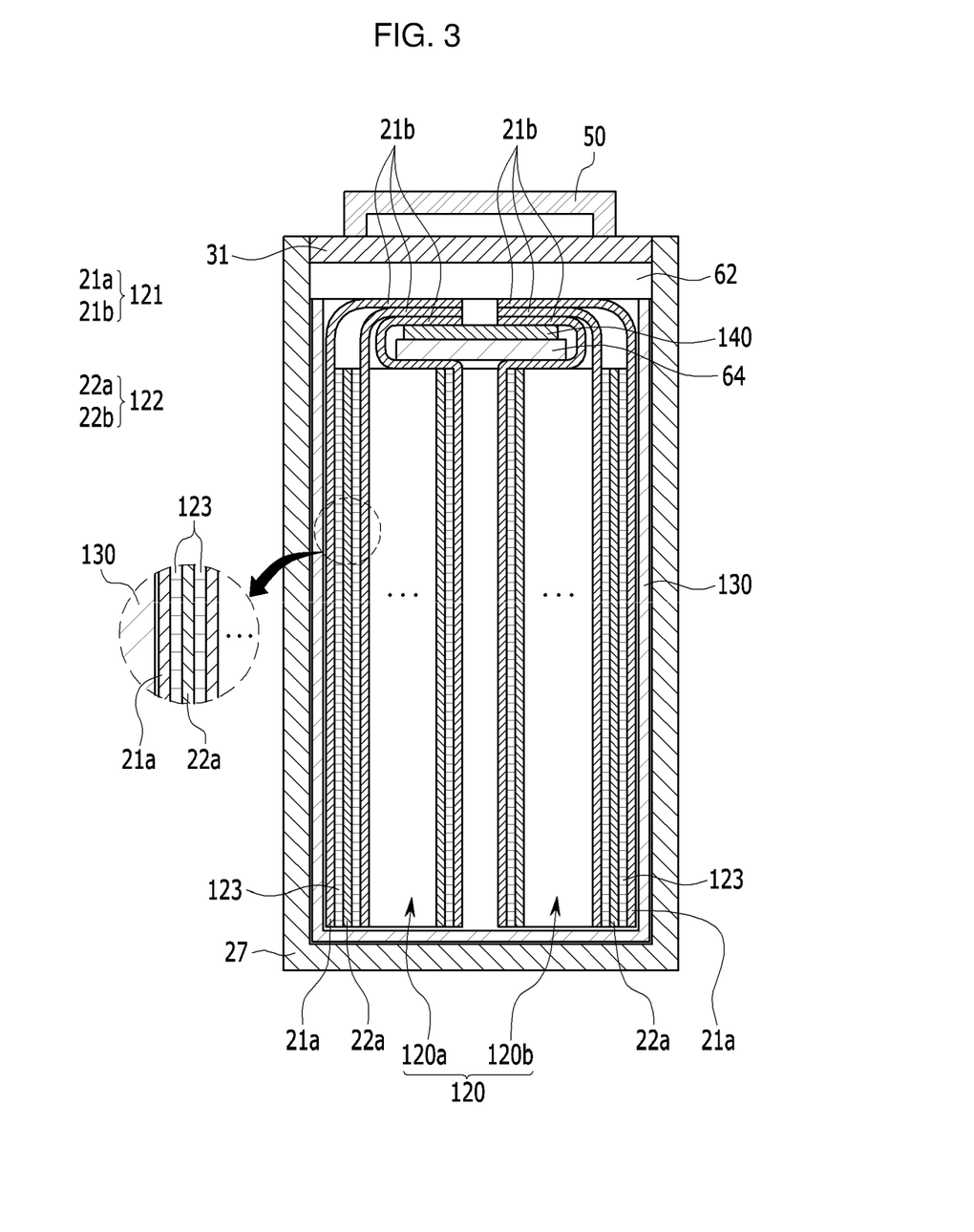
FIG. 3 is a cross-sectional view of FIG. 1, taken along the line III-III.

FIG. 1 is a perspective view of a rechargeable battery according to an exemplary embodiment of the present invention, FIG. 2 is a cross-sectional view of FIG. 1, taken along the line II-II, and FIG. 3 is a cross-sectional view of FIG. 1, taken along the line III-III.

As shown in FIG. 1 to FIG. 3, a rechargeable battery 101 according to an exemplary embodiment of the present invention includes an electrode assembly 120, current collecting members 140 and 142 that are electrically connected with the electrode assembly 120, a case 27 where the current collecting members 140 and 142 and the electrode assembly 120 are installed, and a cap assembly 30 combined to an opening of the case 27. The electrode assembly 120 is formed by spirally winding a first electrode 121 and a second electrode 122, while disposing a separator 123 therebetween.

The rechargeable battery 101 is exemplarily described as a prism-shaped lithium ion secondary battery. However, the present invention is not limited thereto, and may be applied to various shapes of batteries.

The electrode assembly 120 may include a plurality of assemblies 120a and 120b, and each of the assemblies 120a and 120b may be pressed to be flat after spirally winding the first electrode 121 and the second electrode 122 around a winding axis, while disposing the separator 123 therebetween. The first electrode 121 and the second electrode 122 include electrode activated portions 21a and 22a, which are regions where an active material is coated on a thin plate that is formed of a metal foil, and electrode uncoated regions 21b and 22b, which are regions where an active material is not coated.

The first electrode activated portion 21a may be formed by coating an active material such as a transition metal oxide and the like on a metal foil such as aluminum, and the second electrode activated portion 22a may be formed by coating an active material such as graphite or carbon on a metal foil such as copper or nickel.

The first electrode uncoated region 21b and the second electrode uncoated region 22b respectively protrude toward the cap assembly 120 from one end of each of the first and second activated portions 21a and 22a. Since the first electrode uncoated region 21b and the second electrode uncoated region 22b enable the metal foil to be protruded by cutting the same, the first electrode uncoated region 21b and the second electrode uncoated region 22b may be integrally formed with the metal foil of the first electrode activated portion 21a and the metal foil of the second electrode activated portion 22a. The first electrode uncoated region 21b and the second electrode uncoated region 22b have different polarities, and thus they are disposed apart from each other in order to prevent a short circuit after spiral-winding them.

In addition, since the first electrode 121 and the second electrode 122 are iteratively wound and thus are overlapped, the first electrode uncoated region 21b and the second electrode uncoated region 22b may be formed by overlapping a plurality of thin plates. As described, when a plurality of thin plates are overlapped, the thin plates may be connected to each other by ultrasonic welding in order to ease current movement.

The separator 123 is disposed between the first electrode activated portion 21a and the second electrode activated portion 22a, and prevents occurrence of a short-circuit and enables movement of lithium ions, and, for example, may be formed of a complex film of polyethylene, polypropylene, polyethylene, and polypropylene.

The electrode assembly 120 may be inserted into the case 27 in a direction that is parallel with the winding axis, and the electrode assembly 120 may be substantially received in the case 27 together with an electrolyte solution. The electrolyte solution may be formed of a lithium salt such as $LiPF_6$, $LiBF_4$, and the like in an organic solvent such as EC, PC, DEC, EMC, and DMC. The electrolyte solution may be a liquid, solid, or gel-like.

The electrode assembly 120 may include the first electrode assembly 120a and the second electrode assembly 120b, and this will be described with reference to FIG. 4.

Figure 4:
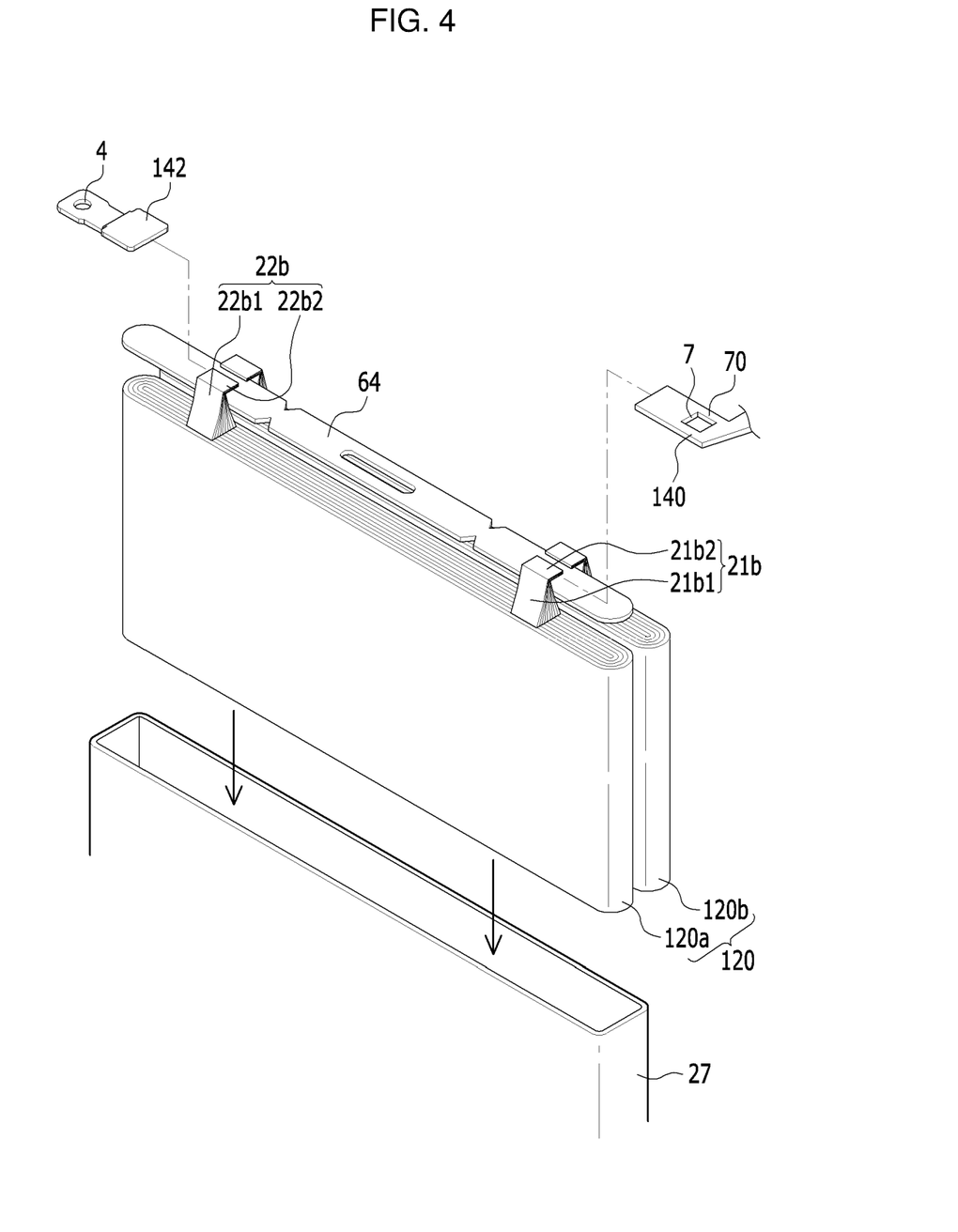
FIG. 4 and FIG. 5 are perspective views of a part of the rechargeable battery of FIG. 1.

FIG. 4 is a perspective view of a part of the rechargeable battery of FIG. 1, and shows the case, the electrode assembly, and the current collecting member.

As shown in FIG. 4, the first electrode assembly 120a and the second electrode assembly 120b included in the electrode assembly 120 may be electrically connected to each other.

Electrode uncoated regions having the same polarity in the first electrode assembly 120a and the second electrode assembly 120b are electrically connected with each other by current collecting members. That is, the first uncoated region 21b of the first electrode assembly 120a and the first electrode uncoated region 21b of the second electrode assembly 120b are electrically connected by the first current collecting member 140, and the second electrode uncoated region 22b of the first electrode assembly 120b and the second electrode uncoated region 22b of the second electrode assembly 120b are electrically connected by the second current collecting member 142.

In this case, the first electrode uncoated regions 21b of the first and second electrode assemblies 120a and 120b are bent in a direction such that they face each other, and the second electrode uncoated regions 22b of the first and second electrode assemblies 120a and 120b are bent in a direction such that they face each other. Thus, the respective electrode uncoated regions 21b and 22b may have first uncoated regions 21b1 and 22b1 that are connected with the metal foil of the electrode activated portion and protrude in a direction of the cap assembly, and second uncoated regions 21b2 and 22b2 of which one side of each extends from the first uncoated regions 21b1 and thus contacts the current collecting members 140 and 142.

One side (i.e., a surface that is relatively close to the cap plate) of the first current collecting member 140 and one side (i.e., a surface that is relatively close to the current collecting member) of the second uncoated region 21b2 may contact each other and thus are electrically connected, and one side (i.e., a surface relatively close to the cap plate) of the second current collecting member 142 and one side (i.e., a surface relatively close to the current collecting member) of the second uncoated region 22b2 may contact each other and thus are electrically connected.

The first current collecting member 140 and the second current collecting member 142 are substantially formed in the shape of a quadrangular plate, and may be formed of a low resistance metal, and for example, the first current collecting member 140 may be formed of aluminum and the second current collecting member 142 may be formed of copper.

The first current collecting member 140 is integrally formed with a cap plate 31 and is bent into the case 27 (refer to FIG. 2) from the cap plate 31. The first current collecting member 140 may be bent in various directions to ease contact with the first electrode uncoated region.

The first current collecting member 140 includes a fuse hole 7, and the fuse hole 7 may be a slit that horizontally crosses the first current collecting member 140 in a width direction, and a portion removed by the fuse hole 7 and thus remains at lateral sides of the fuse hole 7 becomes a fuse 70. The fuse 70 formed by the slit-shaped fuse hole 7 formed in the first current collecting member 140 has a narrow width and thus is disconnected by being melted when a temperature is increased over a predetermined temperature. Thus, when heat occurs due to malfunction of the rechargeable battery, the fuse 70 is disconnected to prevent the rechargeable battery from being additionally heated, thereby preventing explosion of the battery due to heating.

The first current collecting member 140 may further include a blocking member (not shown) that surrounds the first current collecting member 140 that includes the fuse 70. The blocking member is formed as an insulator, and prevents an arc. The blocking member may be formed of polyimide, and alternatively, may be formed of a heat-resistant resin such as Teflon and the like.

The second current collecting member 142 includes a terminal hole 4, and the terminal hole 4 is a hole into which a connection terminal 250 that is connected with a second terminal 52 outside the cap assembly 30 (refer to FIG. 2) and thus moves a current is inserted, and the terminal hole 4 may have the same shape as a horizontal cross-section of the connection terminal 250 (refer to FIG. 2), for example, a circle.

Referring back to FIG. 1 to FIG. 3, the case 27 is substantially formed in the shape of a cuboid, and an opening is formed in one side thereof. The case 27 may be formed of a metal such as aluminum, stainless steel, and the like.

The cap assembly 30 includes the cap plate 31 that covers the opening of the case 27, a first terminal 50 that protrudes outside the cap plate 31 and is electrically connected with the first electrode 121, and the second terminal 52 that protrudes outside the cap plate 31 and is electrically connected with the second electrode 122.

The cap plate 31 is formed in the shape of a long plate that extends in one direction, and is coupled to the opening of the case 27. The plate 31 may be formed of the same material as the case 27, and may be coupled to the case 27 by laser welding. Thus, the cap plate 31 may have the same polarity as the case 27.

A vent plate 39 where a notch 2 is formed is provided in a vent hole 34 such that the cap plate 31 can be ruptured at a predetermined pressure. In addition, the cap plate 31 includes a cutout 5 that corresponds to the first current collecting member 140, and the first terminal 50 is coupled to the cutout 5 and thus seals the inside of the case 27.

The first terminal and the first current collecting member will now be described in detail with reference to FIG. 5 and the above-described FIG. 2.

Figure 5:
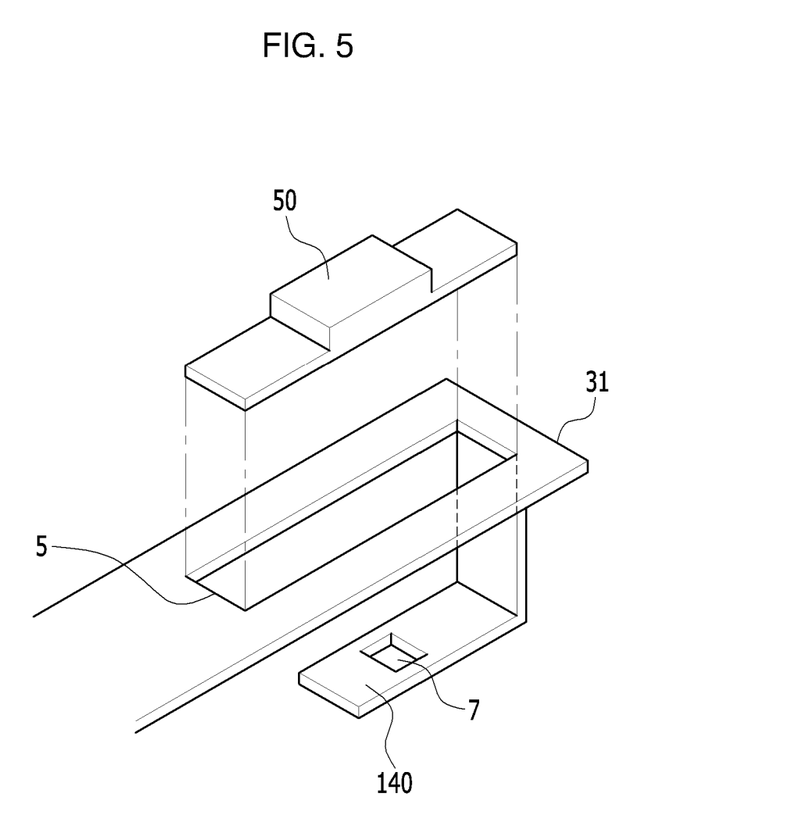

FIG. 5 is an exploded perspective view of a part of the rechargeable battery of FIG. 1, and the first terminal, the cap plate, and the first current collecting member are illustrated.

Referring to FIG. 2 and FIG. 5, the first terminal 50 protrudes in a direction along which the plate-shape member is away from the first current collecting member 140, and has a concave shape that is opened toward the electrode assembly inside the case 27.

The first current collecting member 140 may be formed by cutting a part of the cap plate 31 and then bending it inward of the case 27. Thus, the part separated from the cap plate 31 is folded and is located inside the case 27, and the part located inside the case 27 is used as the first current collecting member 140.

Since the first current collecting member 140 is formed by cutting a part of the cap plate 31 and folding it into the case 27, the part of the cap plate 31 becomes the cutout 5. Thus, the first current collecting member 140 may have a fixed end connected with the cap plate 31 and a free end connected with the first electrode uncoated region 21b, and an outer edge of the first current collecting member 140 may match an inner edge of the cutout 5 before cutting and bending are carried out.

When the first current collecting member 140 is formed by using the cap plate 31 as in the exemplary embodiment of the present invention, a structure for connecting the first current collecting member with the cap plate, the terminal, and the electrode assembly can be simplified. That is, the first terminal is directly connected with the cap plate and the first current collecting member such that a current path can be shortened. Thus, a current loss due to a resistance increase according to an increase of the current path can be minimized.

Meanwhile, the cutout 5 may be used as an opening for injection of an electrolyte solution, and the electrolyte solution may be injected before coupling the first terminal 50 to the cap plate 31 through the cutout 5 by welding. Thus, a separate electrolyte injection hole may not need to be formed, but this is not restrictive. An additional electrolyte injection hole (not shown) may be formed in the cap plate as necessary.

Referring back to FIG. 1 to FIG. 3, the second terminal 52 may be electrically connected with the second electrode of the electrode assembly 120 through the connection terminal 250.

The second terminal 52 is disposed on a first insulation member 60 formed on the cap plate 31 so as to prevent it from being short-circuited with the cap plate 31.

The connection terminal 250 may be inserted into a short-circuit hole of a member to be connected in a columnar shape, and can establish electrical connection therebetween. That is, the connection terminal 250 is fitted into terminal holes 4, 6, and 9 that are respectively formed in the second terminal 52, the cap plate 31, and the first insulation member 60.

In addition, an upper end of the connection terminal 250 is fixed to the second terminal 52 by welding while being fitted into the terminal hole 9 of the second terminal 52. Further, a lower end of the connection terminal 250 is fixed to the second current collecting member 142 by welding while being fitted into the terminal hole 4 of the second current collecting member 142.

Thus, the electrode assembly is electrically connected with the second terminal 52 through the second current collecting member 142 that is connected with the second electrode uncoated region 22b and the connection terminal 250.

A sealing gasket 59 is provided in the terminal hole 6 formed in the cap plate 31 to seal between the connection terminal 250 and the cap plate 31.

A short-circuit protrusion 3 that protrudes toward a short-circuit hole 37 formed in the cap plate 31 is formed below the second terminal 52. The second terminal 52 extends in one direction to cover the short-circuit hole 37. Thus, the first insulation member 60 may extend along the second terminal 52 while surrounding lateral sides of the second terminal 52.

A short-circuit member 56 that is connected with lateral walls of the short-circuit hole 37 and short-circuits the first electrode 121 and the second electrode 122 is provided in the short-circuit hole 37 of the cap plate 31.

The short-circuit member 56 includes a curved portion that is curved in an arcuate shape that is convex toward the electrode assembly 120, and an edge portion formed on the outer side of the curved portion and fixed to the lateral wall of the short-circuit hole 37.

When a gas is generated due to an abnormal reaction inside a rechargeable battery, the internal pressure of the rechargeable battery rises. When the internal pressure of the rechargeable battery is higher than a predetermined pressure, the curved portion becomes convex in the second terminal 52 direction, causing a short circuit by contacting the short-circuit protrusion 3 of the second terminal 52. Thus, when a short circuit occurs, no further battery reaction occurs, and explosion due to an increase in internal pressure can be prevented.

Meanwhile, since in the case 27 and the cap plate 31, the first current collecting member 140 that is connected with the first electrode is integrally formed with the cap plate 31, the case 27 and the cap plate 31 are charged with the same polarity as the first electrode In addition, the first insulation member 60 is disposed between the second terminal 52 and the cap plate 31 for electrical insulation therebetween. In this case, the first insulation member 60 is formed to surround lateral sides of the second terminal 52, excluding the top surface of the second terminal 52, and thus a short circuit with the cap plate 31 can be more effectively prevented.

Insulation members 62 and 64 may be respectively provided between the second current collecting member 142 and the cap plate 31 and between the second current collecting member 142 and the electrode assembly 120. The insulation members 62 and 64 support the current collecting member while insulating the members of different polarities from each other to prevent them from being short-circuited. In addition, the electrode assembly 120 may be surrounded by an insulation case 130.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

DESCRIPTION OF SYMBOLS

| | |
|---|---|
| 2: notch | 3: short-circuit protrusion |
| 4, 6, 9: terminal hole | 5: cutout |
| 7: fuse hole | 21a, 22a: electrode activated portion |
| 21b, 22b: electrode uncoated region | 27: case |
| 30: cap assembly | 34: vent hole |
| 37: short-circuit hole | 50: first terminal |
| 52: second terminal | 56: short-circuit member |
| 59: sealing gasket | 60, 62, 64: insulation member |
| 70: fuse | 101: rechargeable battery |
| 120, 120a, 120b: electrode assembly | |
| 121: first electrode | 122: second electrode |
| 123: separator | 130: insulation case |
| 140, 142: current collecting member | 250: connection terminal |

The invention claimed is:

1. A rechargeable battery comprising:
an electrode assembly that includes a first electrode, a second electrode, and a separator that is disposed between the first electrode and the second electrode;
a case that receives the electrode assembly and includes an opening;
a cap plate that is coupled to the opening and includes a cutout that is a through-hole penetrating the cap plate;
a first current collecting member that is integrally formed with the cap plate and is bent toward the inside of the case from the cap plate, and is electrically connected with the first electrode, wherein a fixed end of the first current collecting member is located at an edge of the cutout; and
a fuse formed in the first current collecting member.

2. The rechargeable battery of claim 1, wherein the first current collecting member comprises the fixed end that is located at the edge of the cutout and a free end that is disposed inside the case, and the first electrode is connected with the free end.

3. The rechargeable battery of claim 1, further comprising a first terminal that is coupled to the cutout to seal the case.

4. The rechargeable battery of claim 3, wherein the first terminal protrudes in a direction along which a plate-shape member is away from the first current collecting member.

5. The rechargeable battery of claim 1, wherein an outer edge of the first current collecting member matches an inner edge of the cutout.

6. The rechargeable battery of claim 1, wherein the first current collecting member is formed by cutting a part of the cap plate and bending the cut part of the plate.

7. The rechargeable battery of claim 1, further comprising: a first insulation member that is disposed on the cap plate outside of the case; and
a second terminal that is disposed on the insulation member.

8. The rechargeable battery of claim 7, further comprising a second current collecting member, and a connection terminal that electrically connects the second current collecting member and the second terminal,
wherein the connection terminal in a shape of a column is connected with the second current collecting member through one end thereof, and is provided while penetrating the cap plate, the first insulation member, and the second terminal.

9. The rechargeable battery of claim 8, further comprising a second insulation member that is disposed between the second current collecting member and the cap plate.

* * * * *